(12) United States Patent
Berger et al.

(10) Patent No.: US 6,679,362 B2
(45) Date of Patent: Jan. 20, 2004

(54) ACTUATOR DEVICE FOR A CLUTCH DEVICE

(75) Inventors: Reinhard Berger, Bühl (DE); Michael Gallion, Karlsruhe (GB)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/138,788

(22) Filed: May 3, 2002

(65) Prior Publication Data
US 2002/0185351 A1 Dec. 12, 2002

Related U.S. Application Data (63) Continuation of application No. PCT/DE00/03710, filed on Oct. 18, 2000.

(30) Foreign Application Priority Data

Nov. 4, 1999 (DE) .......................................... 199 53 033

(51) Int. Cl.[7] .............................................. B60K 23/02
(52) U.S. Cl. ....................... 192/31; 192/3.61; 192/84.6; 192/84.91; 192/85 C; 192/142 R
(58) Field of Search .............................. 192/30 R, 84.9, 192/52.4, 3.62, 31, 142 R, 84.6, 84.91, 85 C (56) References Cited

U.S. PATENT DOCUMENTS

| | | | |
|---|---|---|---|
| 4,936,428 A | * | 6/1990 | Leigh-Monstevens et al. ......... 477/87 |
| 5,679,098 A | * | 10/1997 | Shepherd et al. ........... 477/166 |
| 5,847,272 A | * | 12/1998 | Schneider et al. ......... 73/118.1 |

FOREIGN PATENT DOCUMENTS

| | | | |
|---|---|---|---|
| DE | 19723393 A1 | * | 12/1997 |
| DE | 44 33 825 C2 | | 4/1998 |
| DE | 19850977 A1 | * | 5/1999 |

* cited by examiner

*Primary Examiner*—Saul Rodriquez
(74) *Attorney, Agent, or Firm*—Darby & Darby (57) ABSTRACT

A clutch-actuator device is equipped with a position-detecting device for detecting at least one of the different possible positions of engagement, disengagement and partial engagement of a clutch that serves to control the amounts of torque being transmitted between two rotary components of a torque-transmitting mechanism. The position-detecting device performs its detecting function independently of any measurement of the clutch position which may be performed by a displacement-measuring device.

31 Claims, 6 Drawing Sheets

ACTUATOR DEVICE FOR A CLUTCH DEVICE

CROSS REFERENCE TO RELATED APPLICATION

This is a continuation of international application Serial No. PCT/DE00/03710, filed Oct. 18, 2000, the entire disclosure of which is hereby incorporated by reference.

BACKGROUND OF THE INVENTION

The invention relates to an actuator device for actuating a clutch device.

The term "clutch device" in the sense of the present invention means a device by which torque can be transmitted between an input shaft and an output shaft and which can be set into different engagement positions by means of an actuator, whereby the amount of torque that can be transmitted is increased, decreased, or set to zero. The clutch device may be configured with or without power branching and preferably includes a start-up clutch, a friction clutch, a reverse-gear clutch, a laminar disc clutch, a magnet-powder clutch, a converter bypass clutch, or another device of the same general category.

With special preference, the clutch is configured as an electronically controlled clutch device in which the movement between different positions of the clutch can be performed under electronic control. An electronically controlled clutch device has been described by and is available from the assignee of the present invention under the name "Electronic Clutch Management (ECM)". An actuator device as understood in the present context includes in particular an electric motor or a hydraulic device as a drive source. Preferably, the drive source for the actuator device is an electric motor pushing the piston of a hydraulic master cylinder by way of a transfer mechanism. The master-cylinder piston transmits pressure through the hydraulic fluid to a slave cylinder. The slave-cylinder piston is preferably coupled to a pressure plate that is movable relative to a clutch disc. Thus, the electric motor serves to set the amount of force that is acting between the pressure plate and the clutch disc.

An actuator device for a clutch device is known from DE 44 33 825, where an actuator device with an incremental displacement sensor is described. The incremental displacement sensor, which serves to detect changes in the position of the clutch device, is adjusted from time to time by performing a check to verify whether the actuator device is supplied with energy and whether or not the incremental displacement sensor is indicating changes in the position of the clutch device. If the incremental displacement sensor is registering a stationary position while at the same time the actuator device is found to receive energy, this combination of factors is used to identify an end-stop position.

OBJECT OF THE INVENTION

The present invention has the objective of providing an actuator device that is based on a different technical design in comparison to the aforementioned known state of the art.

SUMMARY OF THE INVENTION

The actuator device proposed by the present invention serves to actuate a clutch device which has different engagement positions corresponding to different amounts of torque that can be transmitted between a first rotary component and a second rotary component. According to the invention, the actuator device has a position-detecting device that serves to detect at least one of the different engagement positions. This detection is performed independently of a displacement-measuring device that may be provided to measure the engagement position.

The displacement-measuring device which may in certain cases be incorporated in embodiments of the present invention is in particular designed to measure the engagement position or a change in the engagement position of at least one component of the actuator device or the clutch device under a predetermined set of conditions. The displacement-measuring device, which uses in particular a sensor arrangement, is configured either as an absolute or as an incremental measuring device. The displacement-measuring device is preferably based on a concept of detecting a number of markers that are arranged along the displacement path.

The position-detecting device serves to detect at least one engagement position under a predetermined set of conditions. The detection performed by the position-detecting device is independent of characteristic values that are generated by the displacement-measuring device.

In one embodiment of the foregoing concept, the position-detecting device detects or otherwise determines a characteristic value and then performs a comparison between the characteristic value and a predetermined limit. The characteristic value found by the position-detecting device as well as the predetermined limit are independent of a displacement-measuring device that may in some cases exist together with the position-detecting device. The detected or otherwise determined characteristic value preferably represents an electrical quantity, such as a current or voltage, that is supplied to the drive source of the actuator device. Preferably, the characteristic value is representative of the magnitude of the mechanical resistance that the actuator device has to overcome in order to move the clutch. Based on the comparison between the characteristic value and the predetermined limit, the position-detecting device indicates that the actuator device is at a predetermined engagement position or in a predetermined range of engagement positions. In the context of the present invention, the engagement position is indicated either in absolute terms or in relation to another engagement position.

In a further embodiment of the inventive concept, the position-detecting device detects or otherwise determines a characteristic value as well as the time gradient (rate of change) of the characteristic value and then compares the time gradient to at least one predetermined maximum or minimum value for the time gradient. Based on this comparison, the position-detecting device indicates when the actuator device is in at least one predetermined engagement position. The characteristic value or time gradient in this arrangement is independent of a displacement-measuring device that may in some cases also exist, and it is independent of any measurement of the engagement position of the actuator device. In the context of the present invention, an engagement position represents in particular a predetermined position that can be established in absolute terms. According to a particularly preferred embodiment of the invention, an engagement position can also mean a range of engagement positions, i.e., a range of individual engagement positions that can be determined in absolute terms and are either connected with each other or correlated according to a predetermined characteristic.

As a preferred concept, the position detecting device uses a characteristic operating value as a characteristic value for the determination of a predetermined engagement position of the actuator device. A characteristic operating value is generally a variable value that changes during operation of the actuator device or the clutch device and/or during time periods when a vehicle with the actuator device or clutch device is running. With particular preference, the position-detecting device uses exactly one characteristic value and/or exactly one characteristic operating value to determine at least one predetermined engagement position. With preference, the position-detecting device uses a predetermined characteristic operating value of the drive source of the actuator device which, as mentioned above, is preferably configured as an electric motor. The latter is in particular designed to run under voltage control, meaning that the electric motor is operated and the actuator device is driven by applying a predetermined voltage to the electric motor. While the voltage is thus a given quantity, the position-detecting device uses a characteristic value that varies during operation, such as in particular an electric current or an electric impedance or similar physical quantity, to detect a predetermined engagement position. According to a particularly preferred embodiment of the invention, an electric motor that drives the actuator device is designed to run under voltage control, so that the voltage level is given, while the current can vary dependent on the engagement positions of the actuator device; and the position-detecting device uses the value of the current or a time profile of the current to determine at least one predetermined engagement position of the actuator device.

Preferably, the position-detecting device includes a measuring device to measure at least one characteristic operating value for the detection or determination of a predetermined engagement position.

An actuator device according to a preferred embodiment of the invention has a position-detecting device that measures one and only one characteristic operating value. The latter is in particular a characteristic operating value of the actuator device or the clutch device, or of a motor vehicle that is equipped with the inventive actuator device. Based on this one measured operating value, the position-detecting device identifies at least one predetermined engagement position of the actuator device. It is to be emphasized that according to this embodiment of the invention, there are not a plurality of characteristic operating values being measured, but only one single value which, with particular preference, is not based on an actual position measurement nor a displacement measurement of the actuator device. The measured operating value is used to determine at least one predetermined engagement position of the actuator device. This determination can be based on a direct correlation between the operating value and a predetermined engagement position, or the operating value may be subjected to a computation process or to some other method of determination. In particular, the characteristic operating value may be processed by a computer, based on functional relationships.

A characteristic operating value in the sense of the present invention represents in particular an electrical, hydraulic, or mechanical quantity.

Further in preferred embodiments of the invention, the position-detecting device generates at least one signal dependent on the amount of mechanical resistance—i.e., the magnitude of the opposing force—that the actuator device has to overcome while moving the clutch device from one position to another. Preferably, the actuator device is designed so that the mechanical resistance that opposes a change of the engagement position has a certain magnitude at a predetermined reference position within the range of actuator movement and changes to a different magnitude at the ends of the range and/or in at least one intermediate point of the range and/or substantially over the entire range of actuator movement.

In particular, the variation of the mechanical resistance can be achieved by end stops and/or by an appropriately shaped surface profile interacting with a spring-biased element, or by other suitable design elements. As a preferred solution, an electric drive motor of the actuator device has an output shaft carrying an appropriately shaped surface profile along a circumference. A spring-biased element pushing against the profile generates a variable resistance to the rotary movement of the motor output shaft. Under this same concept, the surface profile may in general be provided on a movable element that is actuated by an electric motor, with a spring-biased element arranged to push against the profile curve, so that as a result, the movement of the mechanism is opposed by a mechanical resistance that varies between the different engagement positions.

According to a preferred embodiment of the invention, the position-detecting device for the engagement position is configured so that it retains the ability to identify at least one engagement position of the actuator device even in the case of a total breakdown of a displacement-measuring device (in cases where the actuator device is equipped with a displacement-measuring device). It is preferred if the position-detecting device is designed to detect at least one predetermined engagement position regardless of whether the actuator arrangement includes a displacement-measuring device and regardless of whether the latter indicates any measurement signal at all or whether it fails to indicate a change when the actuator device moves. With special preference, the position-detecting device is designed so that it will detect at least two and preferably three different engagement positions even in case of a total failure of a displacement-measuring device, in cases where the latter is provided.

With particular preference, the position-detecting device is designed to perform a redundant detection of at least one predetermined engagement position, where that position is also being measured by a displacement-measuring device, and where the position-detecting device operates independently of the displacement-measuring device.

In certain preferred embodiments of the invention, the actuator device includes a displacement-measuring device to identify a current engagement position of the actuator device. The measurement values for the engagement positions are used in particular for the control of the actuator device. Under a preferred concept, the actuator device has a drive source that includes a voltage-controlled electric motor. The voltage supplied to the motor is controlled as a function of the engagement position as determined by the displacement-measuring device. A position-detecting device, which is also part of the actuator, will under certain conditions generate a command signal to initiate a shut-down of the displacement-measuring device, or to withhold the measurement value of the displacement-measuring device from the control of the electric motor, or to set the measurement value to a constant default value, that will no longer change during a movement of the actuator device for at least a predetermined length of time. When or after the displacement-measuring device has been switched off, the position-detecting device will cause the drive source or, more specifically, the electric motor to be supplied with a predetermined amount of energy for a predetermined length of time. This measure is designed to cause the actuator device to move to a predetermined end stop. A sufficient voltage is applied to the motor for a time period that is long enough to ensure that the actuator device will reach the end stop regardless of the current position from which the actuator device has to be moved to the predetermined end position. Specifically, the voltage and the time period are set so that the actuator device will reach the predetermined end stop even from a current position at the farthest possible distance.

At the end of the predetermined time period, or after the drive source has been supplied with a predetermined amount of energy in the direction towards the end stop, or in general after the measure to ensure the movement to the end stop has been completed, the supply of energy to the drive source is shut off, and the arrival at an end-stop position is registered. The sequence of steps initiated by the command signal is used in particular as an emergency procedure which is started after it has been found that the displacement-measuring device is generating incorrect values or has ceased to operate, or under other conditions, such as an insufficient level of confidence in the values supplied by the displacement-measuring device. With particular preference, the process initiated by the command signal is started in accordance with a predetermined characteristic, e.g., at predetermined time intervals or in predetermined states of the actuator device. With special preference, the clutch device under predetermined conditions is moved into full disengagement or full engagement, with the disengagement or engagement being started by the command signal. Preferably, the disengagement and engagement are directed by a control unit in a manner compatible with the current operating situation of the vehicle. In particular, the command signal may be issued for example when the motor vehicle is standing still or when the brakes are applied.

According to a particularly preferred embodiment of the invention, the displacement-measuring device is reactivated after the arrival at the end stop has been registered. When or after the displacement-measuring device is activated, it is set to a predetermined value, or it is kept at the value that was indicated by the displacement-measuring device at the time it was shut off, or it is kept at the value to which it was set at the shut-off. Subsequent to its reactivation, the displacement-measuring device resumes the indication of displacement values relative to the reference value that was set on reactivation.

Preferably, the position-detecting device is designed so that it can detect at least three different engagement positions of the actuator device. According to a particularly preferred embodiment of the invention, the position-detecting device under certain conditions determines at least one engagement position that is arranged between the terminal positions delimiting the displacement range of the clutch device or the actuating device.

Preferably, the position-detecting device is designed so that it identifies a predetermined engagement position of the actuator device under predetermined conditions based on a motion-related characteristic value that depends on at least one characteristic operating value measured by the position-detecting device. In particular, the measured characteristic operating value is not a position value of an engagement position. It is further preferred to determine the rate of change (also referred to as time gradient) of a motion-related characteristic value. Preferably, the time gradient of a motion-related characteristic value, or the motion-related value itself, is used to identify the position that the actuator device is currently set at.

As a particularly preferred concept, the motion-related characteristic value is dependent on a characteristic electrical value of the actuator device. In particular, the characteristic electrical value may be an impedance or an electric current or voltage of the actuator motor.

With preference, the motion-related characteristic value is dependent on the sense of direction in which the actuator device, the drive source, or the electric motor is working.

Preferably, the motion-related characteristic value or its time gradient is monitored. The occurrence of a local extreme, i.e., a peak or dip in the profile of the motion-related characteristic value indicates that a certain engagement position of the actuator device has been reached. Preferably, the occurrence of an absolute extreme is used to indicate that the actuator device has been set to a predetermined engagement position. With preference, the position-detecting device uses at least a second characteristic value, particularly a second characteristic operating value or a value that is a function of the motion-related characteristic value, in order to differentiate and indicate engagement positions with greater precision, reliability, or in more detail. The second characteristic value is in particular a quantity that depends on the amount of energy or the peak amount of energy supplied to the drive source of the actuator device under certain conditions, particularly in start-up phases. With particular preference, the second characteristic value is selected as the maximum value that can occur during a predetermined time interval in a predetermined function that depends on a time integral of the motion-related characteristic value. The predetermined time interval is in particular a time interval of predetermined length, which begins when the drive source of the actuator device, i.e., the electric motor, is started.

According to a preferred embodiment of the invention, a motion-related characteristic value is determined and then compared to a predetermined limit value. The result of this comparison is used under predetermined conditions to determine an engagement position of the actuator device. In the present context, the term "engagement position" may also mean a range of engagement positions. The limit value depends in particular on the second characteristic value, i.e., the characteristic value that is a function of the motion-related characteristic value.

In the sense of the present invention, a motion-related characteristic value is in particular a quantity that depends on at least one of the characteristic values that have an influence on the movement of the actuator device. In particular, the motion-related characteristic value is a quantity that depends on the mechanical resistance, i.e., the force that opposes the movement of the actuator device.

According to a particularly preferred embodiment of the invention, the motion-related characteristic value at the start-up of the drive source of the actuator device (more specifically, the electric motor) is larger than the limit value that applies to the motion-related characteristic value. The limit value, in turn, is larger than the second characteristic value.

With preference, both the motion-related characteristic value and the second characteristic value are larger than the limit value for the motion-related characteristic value in operating situations where the actuator device is at an end stop. According to a particularly preferred embodiment of the invention, the actuator device has a displacement-measuring device measuring an actual position. The latter is compared to a predetermined reference position if the actuator device has been found to have arrived at a predetermined engagement position or a limit stop position. The reference position is correlated with the limit stop position or with the engagement position in accordance with a predetermined characteristic. If necessary, the reference position and the actual position are reconciled with each other at this point.

The drive source in preferred embodiments of the invention is designed to drive the actuator device in either sense of direction.

In certain embodiments where the drive source is an electric motor, the drive energy or a characteristic value that determines the drive energy, such as a voltage or the time interval during which the voltage is applied without changing the sense of direction, is limited to a predetermined total amount of energy or to a predetermined voltage, or a predetermined duration, or a similar limit criterion. After the drive source has been supplied with a specific total or cumulative amount of energy without changing the sense of direction, the drive source is switched off at least temporarily. With particular preference, in determining the cumulative amount of energy, only those time segments of the energy flow are counted which exceed a predetermined energy level. In particular, any segments in the energy flow are not counted which are too small to overcome the system-inherent friction of the actuator device and to cause a movement of the actuator device.

According to a particularly preferred embodiment of the invention, a condition where the aforementioned specific amount of total energy has been supplied to the drive source of the actuator device without a change in the sense of direction is interpreted as a completed move to an end-stop position.

Under a preferred concept of the invention, an actuator device equipped with an electric motor as a drive source has a means of determining a confidence level that allows a quantitative or qualitative determination of the probability that the engagement positions of the clutch device were determined correctly.

Dependent on the aforementioned confidence level, a limit for the total energy to be supplied to the electric motor is set at a predetermined value.

The scope of the invention further includes any clutch device that is equipped with an actuator device conforming to one of embodiments described herein.

Also included under the scope of the present invention is any method of operating an actuator device in accordance with the concepts implied in the embodiments discussed herein.

As a linguistic formality, where the names of features are connected by the word "or", this should be understood in the broadest sense, i.e., either as a logic type of or (one or the other or both) or an exclusive or (one or the other but not both), whichever fits the context.

The terms "control" and "regulation" and their derivatives are used herein with a broad range of meanings encompassing closed-loop as well as open-loop control of devices, functions and processes, including in particular the DIN (Deutsche Industrie-Norm) definitions for regulation and/or control).

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

Embodiments of the invention are described below as examples only, and no limitations are thereby implied. The description refers to the attached drawings, wherein.

DETAILED DESCRIPTION OF THE INVENTION

Figure 1:
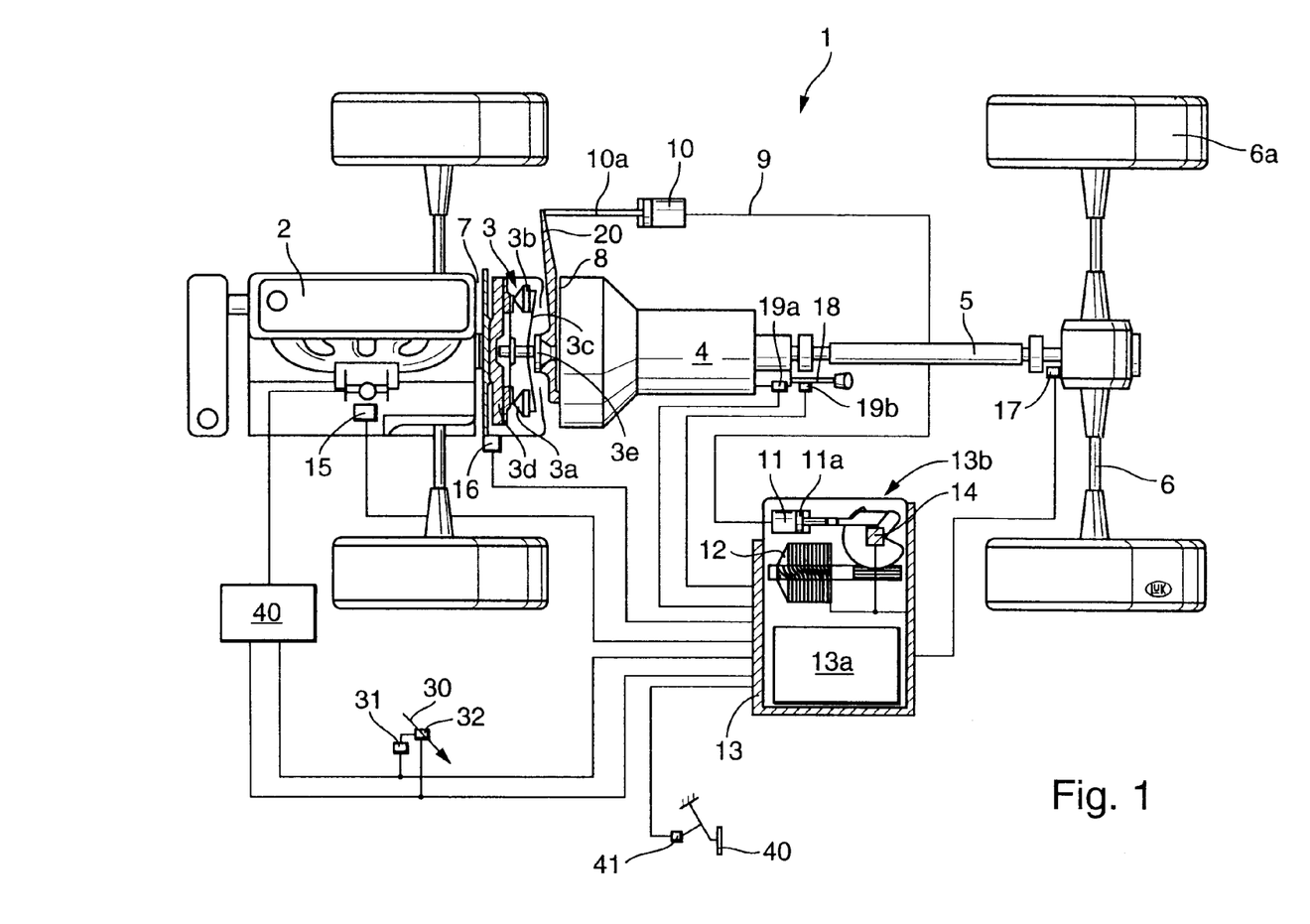
FIG. 1 represents a first exemplary embodiment in a schematic and partially sectional view.

FIG. 1 gives a schematic view of a vehicle 1 with a drive unit 2 such as a motor or combustion engine. The power train of the vehicle further contains a torque-transmitting device 3 and a transmission 4. The illustrated example shows the torque-transmitting device 3 arranged in the torque flow path between the engine and the transmission, so that the driving torque generated by the engine is passed on by way of the torque-transmitting device 3, the transmission 4, the drive shaft 5, and the driving axle 6 to the wheels 6a.

The torque-transmitting device 3 is configured as a clutch, such as a friction clutch, laminar disc clutch, magnet powder clutch, or converter bypass clutch. The clutch may be of the self-adjusting, wear-compensating type. The transmission 4 is shown as a manual shift transmission in which the transmission ratio is changed in steps. However, under the concept of the invention, the transmission may also be an automated shift transmission in which the shifting process is automated by means of at least one actuator. The term "automated shift transmission" further means an automated transmission of a type where the tractive force is interrupted during gear shifts and where the shifting from one transmission ratio to another is performed by means of at least one actuator.

It is also possible to use a conventional automatic transmission of the type that works without interrupting traction during gear shifts and is normally based on planetary gear stages.

As a further possibility, a transmission with a continuously variable transfer ratio, such as for example a cone-pulley transmission, may be employed in embodiments of the invention. If a conventional automatic transmission is used, the latter may be equipped with a torque-transmitting device 3, e.g., a clutch or friction clutch, arranged at the output side of the transmission. The torque-transmitting device can further be configured as a start-up clutch and/or as a reverse-gear clutch and/or as a safety clutch in which the magnitude of the transmittable torque can be controlled at a targeted level. The torque-transmitting device can be a dry friction clutch, or a so-called wet-running friction clutch that runs in a fluid, or it may consist of a torque converter.

The torque-transmitting device 3 has an input side 7 and an output side 8. A torque is transmitted from the input side 7 to the output side 8 through a contact force that is applied to the clutch disc 3a by means of the pressure plate 3b, the diaphragm spring 3c, the release bearing 3e, and the flywheel 3d. The force is generated by an actuator pushing or pulling the release lever 20.

The torque-transmitting device 3 is controlled by means of a control unit 13 which may be configured as a control device with an electronic module 13a and an actuator 13b. In another advantageous embodiment, the actuator and the electronic module may also be accommodated in two separate subassembly units or housings.

The control unit 13 may contain the electronic circuits for the control as well as for the power supply of the electric motor 12 of the actuator 13b. This has the advantage that only one compact portion of space is needed for both the actuator and the electronics. The actuator consists of a motor 12, typically an electric motor driving a hydraulic master cylinder 11 through a gear mechanism such as a worm gear mechanism, a spur gear mechanism, a crank mechanism, or a threaded spindle mechanism. The master cylinder may be driven directly or by way of a rod linkage.

The movement of the output element of the actuator, i.e., of the piston 11a of the master cylinder 11, is detected by a clutch travel sensor 14 which senses a position, or the speed or acceleration of a change in position, of an element whose displacement, speed or acceleration is in direct proportion to the displacement, speed or acceleration of the clutch. The master cylinder 11 is connected through a pressure conduit 9, normally a hydraulic line, to the slave cylinder 10. The output element 10a of the slave cylinder is coupled to the release lever or release element 20. Thus, a movement of the output element 10a of the slave cylinder 10 causes the release element 20 to be moved or tilted to effect a controlled variation of the amount of torque that is transmitted by the clutch 3.

The actuator 13b that controls the torque-transmitting device 3 may be based on a pressure-propagation principle, using a master cylinder and slave cylinder communicating through a pressure medium. The pressure medium can be a hydraulic fluid or a pneumatic medium. The master cylinder may be driven by an electric motor 12 that is electronically controlled. However, instead of an electric motor, the driving element of the actuator 13b may also be based on another drive source, e.g., driven by hydraulic pressure. It is also conceivable to use magnet-based actuators to set a position of an element.

The amount of torque transmitted through a friction clutch is controlled to a targeted level by applying pressure on the friction linings of the clutch disc between the flywheel 3d and the pressure plate 3b. The force that is exerted on the pressure plate and on the friction linings is controlled by the position of the release element 20, whereby the pressure plate is moved to or set and held at any position between two end positions. One end position represents a fully engaged condition of the clutch, and the other end position represents a fully disengaged condition. To set the transmittable torque at an amount that is less than the current engine torque, the pressure plate 3b is moved to a position that lies in an intermediate range between the end positions. By controlling the release element 20 to a set target, the clutch can be held at the targeted position. However, it is also possible to set the transmittable torque above the level of the current engine torque. In this case, the torque generated by the engine is passed on by the clutch, while torque fluctuations, especially abrupt peaks in the torque flow, are damped and/or isolated.

The control and regulation of the torque-transmitting device further relies on sensors which at least part of the time monitor the relevant factors and provide the status data, signals and measurement values that are necessary for the control and are processed by the control unit. The latter may also have communication lines to other electronic units such as, e.g., an electronic engine control unit, or an electronic control of the anti-lock braking system (ABS), or an anti-slip regulation (ASR). The sensors detect, for example, rpm rates of the vehicle wheels or of the engine, the position of the gas pedal, the position of the throttle valve, the currently engaged gear level of the transmission, driver-generated inputs that indicate an impending gear change, and other characteristic information specific to the vehicle and the operating situation.

FIG. 1 shows a throttle valve sensor 15, an engine rpm sensor 16, as well as a vehicle speed sensor 17, which relay measurement data and information to the control device. The electronic unit, such as a computer unit that is part of the control unit 13a, is processing the incoming data and issues control commands to the actuator 13b.

The transmission is configured as a step-shifting transmission, in which the transmission ratio is shifted in discrete, fixed steps by means of a shift lever. The shift lever may operate or actuate the transmission directly. There is further at least one sensor 19b arranged at the shift lever 18 of the manual shift transmission, which serves to detect when the driver intends to shift gears and/or which gear is currently engaged, and to relay the information to the control device. The sensor 19a is connected to the transmission and serves to detect the currently engaged gear of the transmission and/or to detect a condition that indicates that the driver is about to shift gears. The detection of the driver's intent to shift gears can be realized through the use of at least one of the sensors 19a, 19b, if the sensor is a force sensor that responds to a force acting on the shift lever. Alternatively, the sensor could also be a position sensor or displacement sensor, in which case the control unit would recognize an intent to shift gears from a dynamic change of the position signal.

The control device is at least part of the time in signal communication with all of the sensors and evaluates the sensor signals and input data which, in their totality, are referred to as the current operating point of the torque transfer system. Based on the operating point, the control device issues control and regulation command signals to the at least one actuator. The drive element 12 of the actuator, such as an electric motor, operates under the command of the control unit that controls the actuation of the clutch by means of a command signal that depends on the measurement values and/or the system input data and/or signals of the sensors. The control device has a control program in the form of hardware and/or software, which evaluates the incoming signals and calculates or determines the output quantities based on comparisons and/or functions and/or characteristic data arrays or curve fields.

The control unit 13 is advantageously equipped with units or modules for the determination of torques, gear positions of the transmission, amounts of slippage in the clutch, and/or different operating states of the vehicle, or there are signal connections from the control unit 13 to at least one of the aforementioned modules. The modules or units may be implemented in the form of control programs in hardware and/or software. As a result, the incoming sensor signals allow a determination of the torque of the drive unit 2 of the vehicle 1, the gear position of the transmission 4, the amount of slippage in the torque-transmitting device, as well as the current operating state of the vehicle. The gear-position determining unit detects which gear is currently engaged based on the signals from the sensors 19a and 19b. The sensors are coupled to the shift lever and/or to internal mechanical elements of the transmission such as, e.g., a central shifting shaft or shifting rod, to detect the position or movement of these elements. There can further be a gas pedal sensor 31 arranged at the gas pedal 30 to detect the position of the latter. A further sensor 32 may consist of a binary on/off switch to indicate when the engine is idling, i.e., the switch 32 is on when the gas pedal is not being depressed, and it is off when the gas pedal is being actuated. The gas pedal sensor 31, in contrast to the on/off switch 32, provides a quantitative signal representing the degree of actuation of the gas pedal.

Further in FIG. 1, a brake-actuating element 40 is shown which serves to apply the service brake or the parking brake. This can be a brake pedal, a hand-brake lever, or a hand- or foot-operated actuating element of the parking brake. At least one sensor 41 is arranged at the actuating element 40 to monitor the actuation of the latter. The sensor 41 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as for the parking brake. However, the sensor can also be configured as an analog sensor, e.g., as a potentiometer that measures the degree of displacement of the actuating element. This sensor, likewise, can be connected to an indicator signal.

Figure 2:
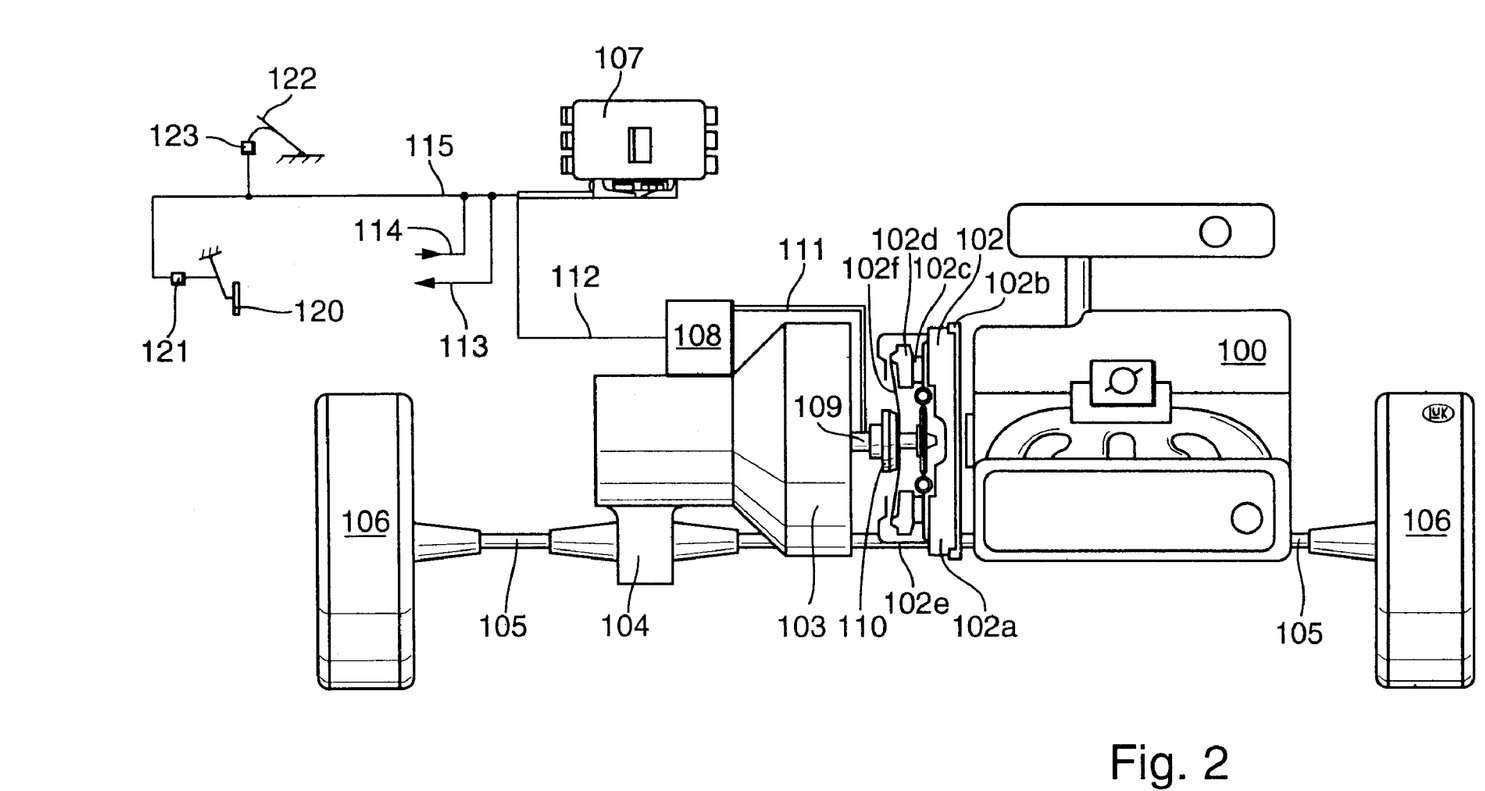
FIG. 2 represents a second exemplary embodiment in a schematic and partially sectional view.

FIG. 2 gives a schematic view of a power train of a motor vehicle with a drive unit 100, a torque-transmitting device 102, a transmission 103, a differential 104, drive axles 105, and wheels 106. The torque-transmitting device 102 is arranged at or connected to a flywheel 102a. The latter as a rule carries an external tooth profile 102b that serves to start the engine. The torque-transmitting device has a pressure plate 102d, a clutch cover 102e, a diaphragm spring 102f, and a clutch disc 102c with friction linings. The clutch disc 102c is interposed between the pressure plate 102d and the flywheel 102a and may be equipped with a damping device. An energy-storing device such as a diaphragm spring 102f pushes the pressure plate axially towards the clutch disc. A clutch-actuating element 109 such as a hydraulically actuated concentric slave cylinder is used to actuate the torque-transmitting device. A release bearing 110 is arranged between the concentric slave cylinder and the prongs of the diaphragm spring 102f. As the release bearing is moved along the axial direction, it pushes against the diaphragm spring and thereby disengages the clutch. The clutch may be configured either as a push-actuated clutch or a pull-actuated clutch.

The actuator module 108 belongs to an automated shift transmission and includes the actuator unit for the torque-transmitting device. The actuator module 108 operates internal shifter elements such as, e.g., a shift-actuating cylinder or a rod mechanism, or a central shifter shaft of the transmission. The actuation may work in a manner where the gears can be engaged and disengaged in sequential order or in an arbitrary order. The clutch-actuating element 109 is operated by way of the connection 111. The control unit 107 is connected to the actuator through the signal line 112. The control unit 107 is further connected by signal lines 113 to 115. The signal line 114 carries incoming signals. The line 113 carries command signals issued by the control unit. The connection 115, consisting for example of a data bus, exchanges signals with other electronic units.

To put the vehicle in motion or to accelerate the vehicle from a stationary or slow rolling condition, the driver has to use only the gas pedal 30, as the controlled or regulated automatic clutch actuation controls the amount of transmittable torque of the torque-transmitting device. The degree of depression of the gas pedal is detected by the gas pedal sensor 31, and the control unit will accordingly implement a more or less forceful or rapid start-up acceleration. The sensor signals from the gas pedal are used as inputs for the control of the start-up phase of the vehicle.

In a start-up phase, the amount of transmittable torque is set as a control target by means of a given function or on the basis of characteristic curves or curve fields that may be functions of the engine rpm rate. The latter may in turn be dependent on other quantities such as the engine torque, that are correlated to the engine rpm rate through a characteristic relationship.

In a start-up process, essentially from a stationary or crawl-speed condition, if the gas pedal is actuated by an amount a, the engine control device will direct the engine to generate an engine torque of a certain magnitude. The control unit of the automated clutch actuation 13 controls the transmittable torque of the torque-transmitting device in accordance with given functions or characteristic curve fields, so that a stationary equilibrium sets in between the engine torque and the clutch torque. The equilibrium is characterized dependent on the gas pedal displacement a by a specific start-up rpm rate, a start-up torque generated by the engine, a specific amount of transmittable torque of the torque-transmitting device, and a specific amount of traction torque delivered to the drive wheels. The functional relationship between the start-up engine torque and the start-up rpm rate will subsequently be referred to as the start-up characteristic. The gas pedal displacement a is proportionate to the aperture of the throttle valve of the engine.

Further in FIG. 2, a brake-actuating element 120 is shown which serves to apply the service brake or the parking brake. This can be a brake pedal, a hand-brake lever, or a hand- or foot-operated actuating element of the parking brake. At least one sensor 121 is arranged at the actuating element 120 to monitor the actuation of the latter. The sensor 121 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as the parking brake. However, the sensor can also be configured as an analog sensor, e.g., as a potentiometer that measures the degree of displacement of the actuating element. This sensor, likewise, can be connected to a signal indicator device.

Figure 3:
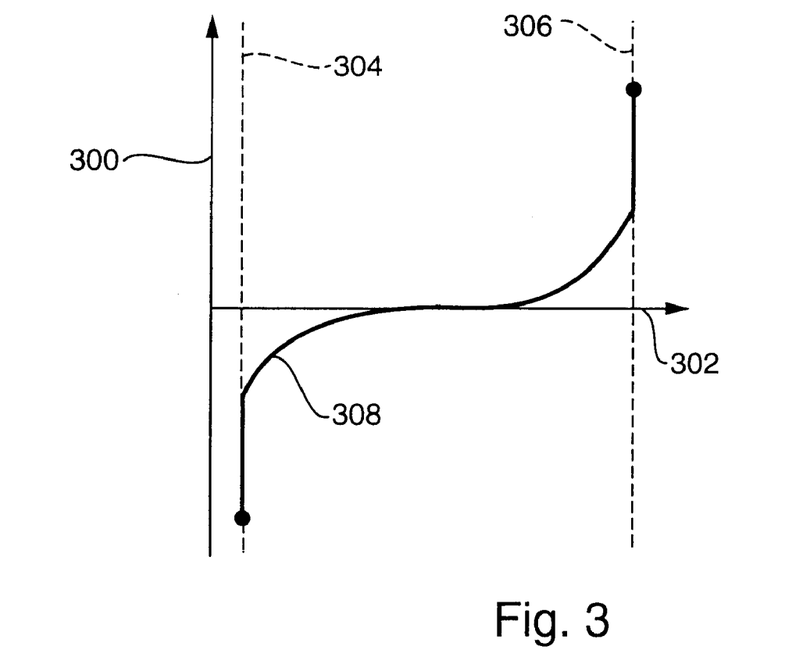
FIG. 3 represents an example in the form of a graph to illustrate the variation of the mechanical resistance over the range of movement of an actuator device according to the invention.

FIG. 3 represents a graph of the mechanical resistance or opposing force measured in the direction of the ordinate 300 as a function of the displacement of the actuator device represented by the abscissa 302. The broken lines 304, 306 schematically indicate the limits of the displacement range, i.e., the end stops of the actuator device.

The curve 308 represents an example of the resistance profile between the range limits 304 and 306.

Figure 4:
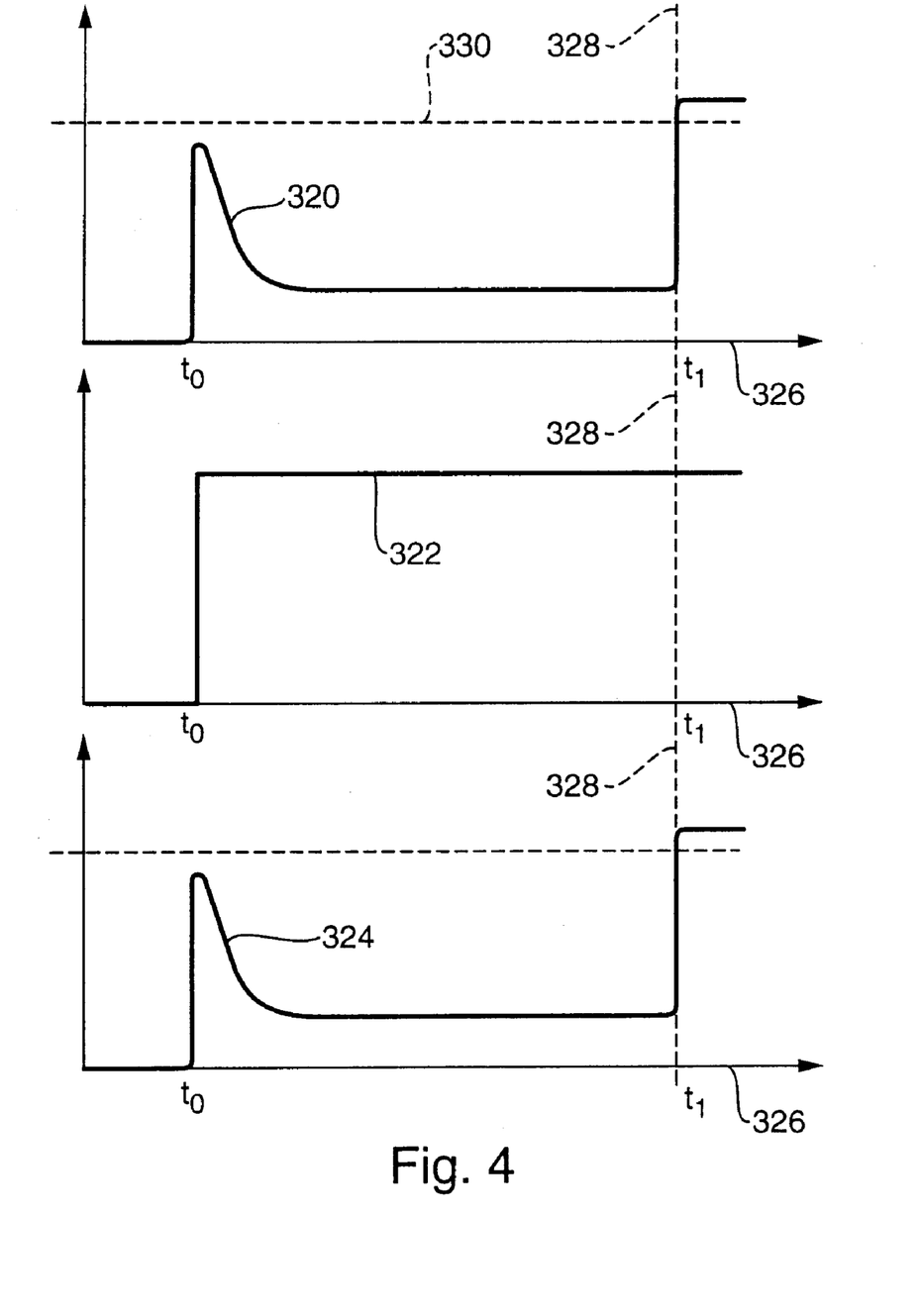
FIG. 4 shows graphs of different characteristic quantities as a function of time, which are representative of the operating behavior of an actuator device according to the invention.

FIG. 4 represents an example of simultaneous profiles of a motion-related characteristic value 320, the voltage 322 of an electric motor, and the current 324 of the electric motor plotted as a function of time, where the latter is measured along the abscissa 326.

The broken line 330 indicates a limit criterion which may be used to distinguish more precisely between different engagement positions or for a more precise interpretation of the time profile of the motion-related characteristic value 320.

At a time t₀, an abrupt increase occurs in the motor current 324, the motor voltage 322, as well as the motion-related characteristic value 320. However, the peak level reached by the motion-related characteristic value at this point falls short of reaching the limit (characteristic value 330). This situation is indicative of the start of the electric motor, but not of a stall of the motor when reaching an end stop.

At the time $t_1$, the motor current 324 and the motion-related characteristic value 320 again show an abrupt increase. In this case, the motion-related characteristic value exceeds the limit 330, which is indicative of a stall of the motor as the actuator device has reached an end stop.

Specifically, the limit 330 is a resistance-based limit.

Figure 5:
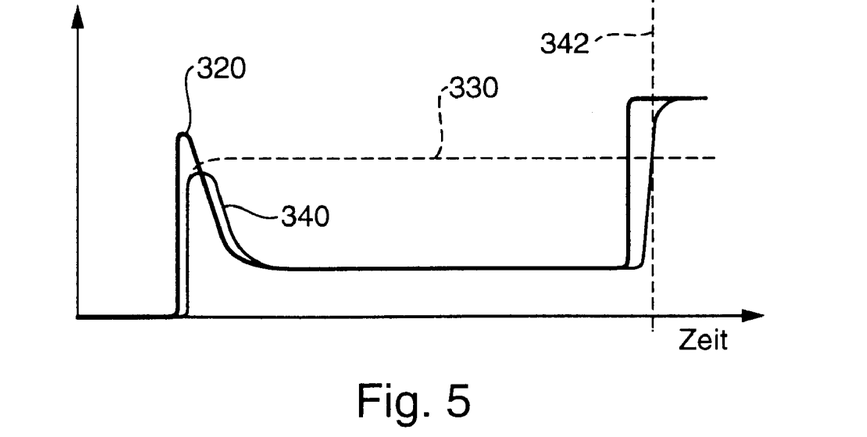
FIG. 5 shows a graph of different characteristic quantities representative of the operating behavior of an actuator device according to the invention.

FIG. 5 illustrates an example that explains how the resistance-based limit can be determined.

The curve 320 in FIG. 5 represents a motion-related characteristic value, and curve 340 represents a second characteristic value. The latter is in particular a function of the time integral of a motion-related characteristic value between the time limits T and T+ΔT. The second characteristic value is calculated in particular by means of a filter. In particular, the second characteristic value 340 represents the maximum possible value that can be assumed by the second characteristic value 340. The resistance-based limit 330 at the start of the electric motor lies between the second characteristic value 340 and the motion-related characteristic value 320. When an end stop is reached, as indicated by the broken line 342, the second characteristic value 340 and the motion-related characteristic value 320 rise above the resistance-based limit 330.

Figure 6:
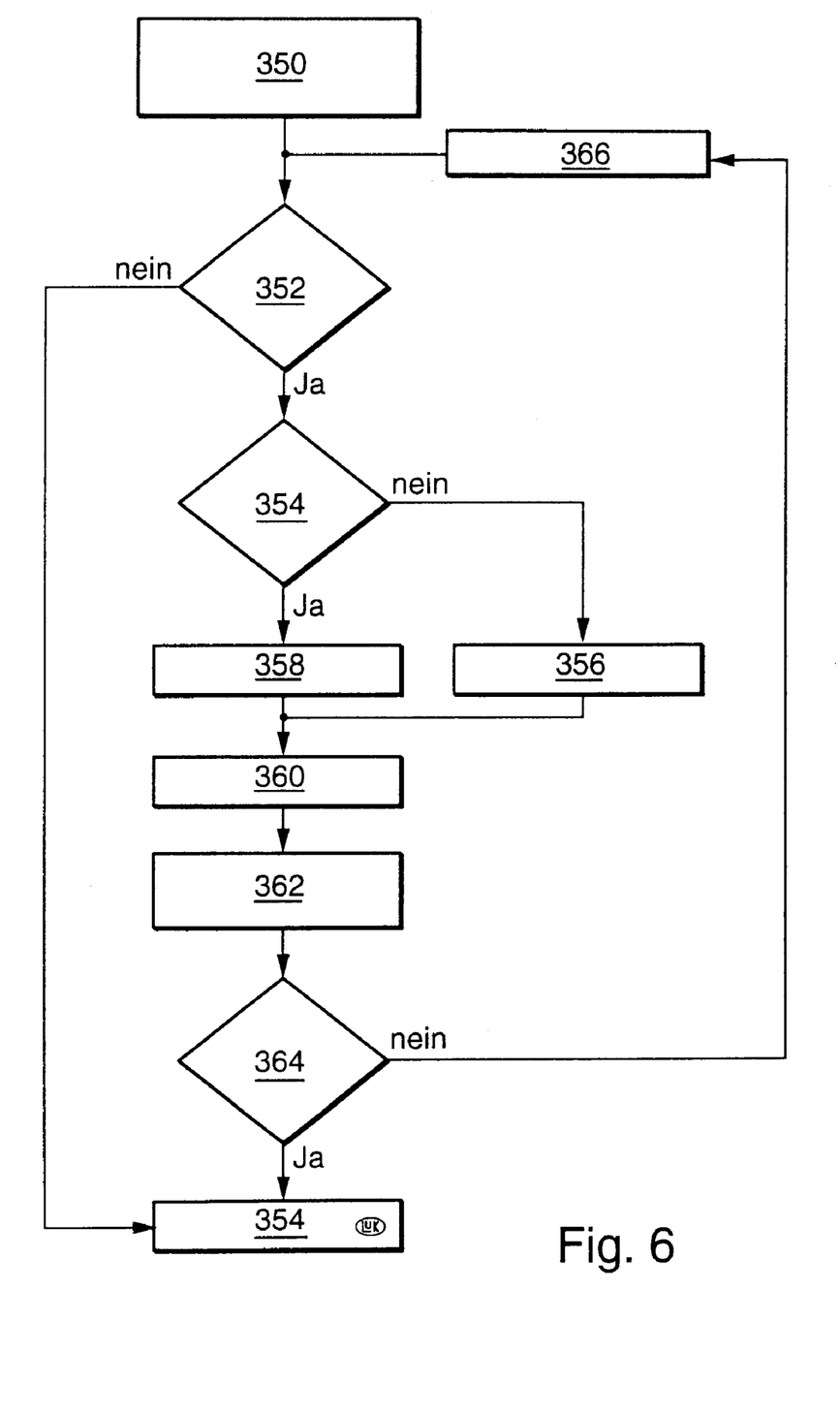
FIG. 6 represents in flow-chart format the steps or operations performed by an actuator device according to the invention.

The flowchart in FIG. 6 illustrates an example of the steps or operations performed by an actuator device according to the invention.

In step 350, a time clock is set to zero at a time when the actuator device is in a substantially stationary condition, i.e., a condition where no voltage is applied to an electric drive motor of the actuator device. In step 352, a test is made as to whether or not the time clock is smaller than a predetermined time limit. In the negative case, the adjustment is terminated in step 368. In the affirmative case, the process continues in step 354 where a test is made whether the clutch is moving in the direction of disengagement. In the negative case, the program passes on to step 356 in which the voltage on the electric motor is set to a predetermined level. In the affirmative case, the program passes on to step 358 in which the voltage on the electric motor is set to a value of opposite polarity and substantially equal magnitude as the predetermined voltage level of step 356.

In step 360, a second characteristic value is computed. With preference, the second characteristic value is determined as a function of the time integral of a motion-related characteristic value in a time interval running from T to T+ΔT.

Next, in step 362, a limit for the mechanical resistance is set to a predetermined value. The predetermined value is in particular a function of the second characteristic value that was determined in the preceding step 360.

Step 364 consists of a test as to whether or not the motion-related characteristic value exceeds the limit that was determined in step 362. In the negative case, the program loops back through step 366, where the time clock is incremented. In the affirmative case, the adjustment process is ended in step 366.

Figure 7:
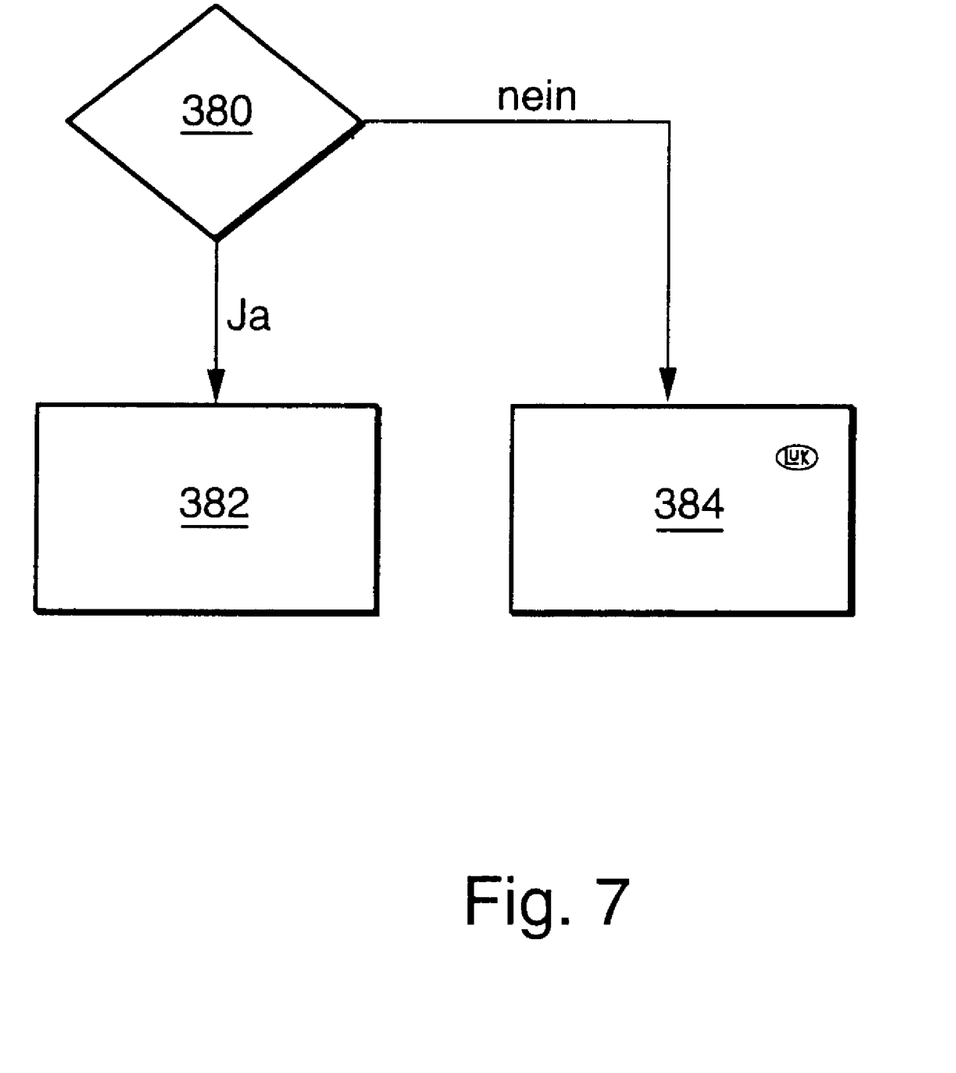
FIG. 7 represents a flow chart of further steps or operations performed by an actuator device according to the invention.

The flowchart in FIG. 7 illustrates a second example of the steps or operations performed by an actuator device according to the invention.

In step 380, a determination is made according to a predetermined characteristic criterion as to whether or not there is a low confidence level in the value or signal indicating the current position of the actuator device. In the affirmative case, the energizing quantity for the drive source, i.e., the electric motor, is set in step 382 to a level that is lower than a predetermined energy limit.

In the negative case of step 380, the program proceeds to step 384 in which the energizing quantity for the drive source is set to a level that is lower than a predetermined maximum limit.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. An actuator device for moving a clutch device into different engagement positions, wherein the different engagement positions correspond to different amounts of torque being transmitted by the clutch device between a first rotary component and a second rotary component, wherein the actuator device comprises a position-detecting device operable to detect at least one of said engagement positions and wherein said actuator device further comprises a displacement-measuring device for measuring said engagement positions, the position-detecting device performs its detection independently of the measurement made by the displacement-measuring device;

wherein:
the actuator device comprises said displacement-measuring device and further comprises a drive source;
the different engagement positions include a predetermined end-stop position;
the position-detecting device is operable to generate a command signal to initiate a shut-down of the displacement-measuring device so that the displacement measuring device will not produce a position signal indicative of a current engagement position among said different engagement positions;
after said shut-down, the position-detecting device will cause the drive source to be supplied with a predetermined amount of energy over a predetermined length of time;
said predetermined amount of energy is sufficient to ensure that the actuator device will reach the end-stop position regardless of the current engagement position;
the supply of energy to the drive source is switched off after the predetermined amount has been supplied; and
the position-detecting device registers the fact that said switch-off has occurred as an indication that the end-stop position has been reached, thereby determining an arrival of the actuator device at the end-stop position without relying on said position signal of the displacement-measuring device;

wherein the drive source comprises an electric motor, and the predetermined amount of energy is supplied by applying a predetermined voltage to the electric motor over the predetermined length of time.

2. The actuator device of claim 1, wherein the position-detecting device is operable to determine a characteristic value, to compare said characteristic value to at least one limiting value, and to indicate based on said comparison whether the actuator device is set at a predetermined position among said engagement positions.

3. The actuator device of claim 2, wherein the characteristic value comprises a time gradient of variable quantity.

4. The actuator device of claim 2, wherein the characteristic value depends on a characteristic operating value of the actuator device.

5. The actuator device of claim 4, wherein the position-detecting device is operable to measure said characteristic operating value by means of a measuring device.

6. The actuator device of claim 5, wherein said characteristic operating value consists of a quantity other than one of the engagement position and a change of the engagement position.

7. The actuator device of claim 1, wherein the position-detecting device is operable to generate at least one signal dependent on a level of mechanical resistance by which a movement of the actuator device is opposed within a movement range.

8. The actuator device of claim 1, wherein the position-detecting device has the capability to perform said detection even in the case of a total failure of the displacement-measuring device.

9. The actuator device of claim 1, wherein
the drive source can drive the actuator in either sense of direction;
the amount of energy that is supplied after starting the drive source without a change in said sense of direction is limited to a predetermined maximum amount; and
the energy supply to the drive source is switched off after the predetermine maximum amount of energy has been reached.

10. The actuator device of claim 9, wherein the fact that the predetermined maximum amount of energy has been supplied without a change in said sense of direction is accepted as an indication that the end-stop position has been reached.

11. The actuator device of claim 1, wherein said clutch device is part of a motor vehicle power train.

12. The actuator device of claim 1, wherein the actuator device comprises said displacement-measuring device.

13. The actuator device of claim 12, wherein the position-detecting device performs its detection as a redundant step in addition to the measurement made by the displacement-measuring device.

14. The actuator device of claim 13, wherein the characteristic operating value is one of an electrical impedance, a voltage, and an electric current.

15. The actuator device of claim 1, wherein the position-detecting determines a characteristic operating value of the drive source and uses said operating value to determine whether the actuator device is at a predetermined position among said different engagement positions.

16. The actuator device of claim 15, wherein the position-detecting device uses said characteristic operating value to determine a motion-related characteristic value as a means of determining whether the actuator device is at said predetermined position.

17. The actuator device of claim 16, wherein the actuator device includes an electric motor as a drive source, and wherein the motion-related characteristic value is a function of at least one characteristic electrical quantity from the group consisting of impedance, current, and voltage of the electric motor.

18. The actuator device of claim 17, wherein the electric motor can drive the actuator in either sense of direction, and herein the motion-related characteristic value depends on said sense of direction.

19. The actuator device of claim 16, wherein the motion-related characteristic value varies as a function of actuator displacement, and wherein at least one of the different engagement positions manifests itself as a local extreme in a time profile of the motion-related characteristic value.

20. The actuator device of claim 19 wherein the position-detecting device uses a second characteristic value as a means of evaluating said time profile with a higher degree of precision.

21. The actuator device of claim 20, wherein an actual engagement position measured by the displacement-measuring device is compared to a reference position, wherein said actual engagement position and said reference position are reconciled with each other at times when the position-detecting device signals that the actuator device is at a predetermined engagement position, and wherein the reference position is correlated to the predetermined engagement position in accordance with a predetermined correlation characteristic.

22. The actuator device of claim 20, wherein the second characteristic value is a function of the motion-related characteristic value.

23. The actuator device of claim 20, wherein the second characteristic value is a function of the amount of energy supplied to the drive source during a start-up phase of the drive source.

24. The actuator device of claim 20, wherein the second characteristic value represents a maximum of a predetermined function of the time integral of the motion-related characteristic value over a predetermined time interval beginning when the drive source is started.

25. The actuator device of claim 20, wherein the motion-related characteristic value is compared to a predetermined limit and said comparison is used to determine that the actuator device is set at a predetermined position among said engagement positions, and wherein said predetermined limit depends on the second characteristic value.

26. The actuator device of the motion-related characteristic value, the predetermined limit, and the second characteristic value are set so that when the drive source is started, the characteristic motion-related value is larger than the predetermined limit, and the predetermined limit is larger than the second characteristic value.

27. The actuator device of claim 20, wherein the motion-related characteristic value, the predetermined limit, and the second characteristic value are set so that when the actuator device is at an end stop, the characteristic motion-related value and the second characteristic value are both larger than the predetermined limit.

28. An actuator device for moving a clutch device into different engagement positions, wherein the different engagement positions correspond to different amounts of torque being transmitted by the clutch device between a first rotary component and a second rotary component, wherein the actuator device comprises a position-detecting device operable to detect at least one of said engagement positions and wherein said actuator device further comprises a displacement-measuring device for measuring said engagement positions, the position-detecting device performs its detection independently of the measurement made by the displacement-measuring device;

wherein:
the actuator device comprises said displacement-measuring device and further comprises a drive source;
the different engagement positions include a predetermined end-stop position;
the position-detecting device is operable to generate a command signal to initiate a shut-down of the displacement-measuring device so that the displacement measuring device will not produce a position signal indicative of a current engagement position among said different engagement positions;
after said shut-down, the position-detecting device will cause the drive source to be supplied with a predetermined amount of energy over a predetermined length of time;
said predetermined amount of energy is sufficient to ensure that the actuator device will reach the end-stop position regardless of the current engagement position;
the supply of energy to the drive source is switched off after the predetermined amount has been supplied; and
the position-detecting device registers the fact that said switch-off has occurred as an indication that the end-stop position has been reached, thereby determining an arrival of the actuator device at the end-stop position without relying on said position signal of the displacement-measuring device;
wherein at the shut-down, the displacement measuring device is set to a predetermined default value.

29. An actuator device for moving a clutch device into different engagement positions, wherein the different engagement positions correspond to different amounts of torque being transmitted by the clutch device between a first rotary component and a second rotary component, wherein the actuator device comprises a position-detecting device operable to detect at least one of said engagement positions and wherein said actuator device further comprises a displacement-measuring device for measuring said engagement positions, the position-detecting device performs its detection independently of the measurement made by the displacement-measuring device;

wherein:
the actuator device comprises said displacement-measuring device and further comprises a drive source;
the different engagement positions include a predetermined end-stop position;
the position-detecting device is operable to generate a command signal to initiate a shut-down of the displacement-measuring device so that the displacement measuring device will not produce a position signal indicative of a current engagement position among said different engagement positions;
after said shut-down, the position-detecting device will cause the drive source to be supplied with a predetermined amount of energy over a predetermined length of time;
said predetermined amount of energy is sufficient to ensure that the actuator device will reach the end-stop position regardless of the current engagement position;
the supply of energy to the drive source is switched off after the predetermined amount has been supplied; and
the position-detecting device registers the fact that said switch-off has occurred as an indication that the end-stop position has been reached, thereby determining an arrival of the actuator device at the end-stop position without relying on said position signal of the displacement-measuring device;
wherein the position-detecting device activates the displacement-measuring device after registering that the end-stop position has been reached.

30. An actuator device for moving a clutch device into different engagement positions, wherein the different engagement positions correspond to different amounts of torque being transmitted by the clutch device between a first rotary component and a second rotary component, wherein
the actuator device comprises a means for detecting said engagement positions;
the actuator device is driven by an electric motor; and
the actuator device comprises a means for determining a characteristic confidence value that is used for a probability estimate that said engagement positions are being determined correctly.

31. The actuator device of claim 30, wherein the electric motor is limited to receiving a predetermined maximum amount of energy in accordance with a predetermined energy characteristic, if said probability estimate falls short of a predetermined minimum probability.

* * * * *